(12) United States Patent
Manz et al.

(10) Patent No.: US 11,919,554 B2
(45) Date of Patent: Mar. 5, 2024

(54) MOBILE TRANSPORT SYSTEM

(71) Applicant: SEW-EURODRIVE GMBH & CO. KG, Bruchsal (DE)

(72) Inventors: Friedrich Manz, Kraichtal-Münzesheim (DE); Jan-Patrick Ködderitzsch, Durmersheim (DE); Theodor Dahl, Bruchsal (DE); Joshua Gordon David Frisch, Hambrücken (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 17/796,080

(22) PCT Filed: Dec. 17, 2020

(86) PCT No.: PCT/EP2020/086751
§ 371 (c)(1),
(2) Date: Jul. 28, 2022

(87) PCT Pub. No.: WO2021/151587
PCT Pub. Date: Aug. 5, 2021

(65) Prior Publication Data
US 2023/0120461 A1    Apr. 20, 2023

(30) Foreign Application Priority Data
Jan. 28, 2020    (DE) .......................... 102020000522.5

(51) Int. Cl.
*B62B 3/00*    (2006.01)
*B62B 5/00*    (2006.01)

(52) U.S. Cl.
CPC ............ *B62B 3/008* (2013.01); *B62B 5/0046* (2013.01); *B62B 2301/02* (2013.01); *B62B 2301/08* (2013.01); *B62B 2301/14* (2013.01)

(58) Field of Classification Search
CPC ... B62B 3/008; B62B 5/0046; B62B 2301/02; B62B 2301/08; B62B 2301/14; B62B 5/02; A61G 5/063; A61G 5/061; A61G 5/068
See application file for complete search history.

(56) References Cited

U.S. PATENT DOCUMENTS

| 4,128,137 A | * | 12/1978 | Booth | ...................... B62D 7/00 |
| | | | | 180/907 |
| 5,871,218 A | * | 2/1999 | Lepage | ................. B62B 3/1492 |
| | | | | 280/124.111 |

(Continued)

FOREIGN PATENT DOCUMENTS

| DE | 202009001103 U1 | * | 6/2009 | ............. B62B 3/008 |
| DE | 102016101490 A1 | * | 8/2017 | ............. B62B 3/008 |

(Continued)

OTHER PUBLICATIONS

Translated DE-102017201108-A1 (Year: 2023).*

(Continued)

*Primary Examiner* — James A Shriver, II
*Assistant Examiner* — Ian Bryce Shelton
(74) *Attorney, Agent, or Firm* — CARTER, DELUCA & FARRELL LLP

(57) ABSTRACT

A mobile transport system for transporting objects in a technical system, includes a vehicle frame, a first wheel pair, a second wheel pair, and a third wheel pair, each having two wheels rotatable relative to the vehicle frame, and a swing frame pivotable about a swing axis extending in a transverse direction relative to the vehicle frame. The first wheels of the first wheel pair are attached to the vehicle frame, and the second wheels of the second wheel pair are attached to the swing frame. The third wheels of the third wheel pair are attached to a tilt frame pivotable relative to the swing frame (Continued)

about a tilt axis extending approximately in the longitudinal direction.

21 Claims, 8 Drawing Sheets

(56) References Cited

U.S. PATENT DOCUMENTS

| | | | | |
|---|---|---|---|---|
| 10,336,380 B2* | 7/2019 | Sakashita | ............... | B62D 21/18 |
| 2005/0263966 A1* | 12/2005 | Barnett | ..................... | B62B 5/02 |
| | | | | 280/5.28 |
| 2007/0289788 A1* | 12/2007 | Salmon | ................. | B62D 51/04 |
| | | | | 180/19.3 |
| 2017/0020755 A1* | 1/2017 | Paul | ....................... | B62D 61/12 |
| 2019/0161330 A1 | 5/2019 | Stammberger | | |
| 2022/0024603 A1* | 1/2022 | Keene | ....................... | B64F 1/36 |

FOREIGN PATENT DOCUMENTS

| | | | | | |
|---|---|---|---|---|---|
| DE | 102017201108 | A1 * | 7/2018 | ............ | B66F 7/0625 |
| DE | 102017201108 | A1 | 7/2018 | | |
| DE | 102017221375 | A1 * | 5/2019 | ............... | B60G 9/02 |
| DE | 102017221375 | A1 | 5/2019 | | |
| EP | 2236391 | A2 * | 10/2010 | ............. | B62B 3/001 |
| EP | 2236391 | A2 | 10/2010 | | |
| EP | 2826693 | A2 * | 1/2015 | ............. | B62B 3/008 |
| EP | 2826693 | A2 | 1/2015 | | |
| EP | 3130522 | A1 * | 2/2017 | ............. | B62B 3/008 |
| EP | 3130522 | A1 | 2/2017 | | |
| WO | WO-2004089730 | A1 * | 10/2004 | ......... | B60B 33/0002 |

OTHER PUBLICATIONS

Translated DE-102017221375-A1 (Year: 2023).*
Translated EP-2236391-A2 (Year: 2023).*
International Report on Patentability issued in corresponding International Application No. PCT/EP2020/086751 dated Jul. 28, 2022, pp. 1-6, English Translation.
International Search Report issued in corresponding International Application No. PCT/EP2020/086751 dated Mar. 26, 2021, pp. 1-2, English Translation.
European Office Action issued in corresponding EP Patent Application No. 20830185.3, dated Oct. 26, 2023, with English Translation.

* cited by examiner

MOBILE TRANSPORT SYSTEM

FIELD OF THE INVENTION

The present invention relates to a mobile transport system, for example, for transporting objects in a technical system, e.g., including a vehicle frame, a first wheel pair, a second wheel pair, and a third wheel pair, each having two wheels rotatable relative to the vehicle frame, and a swing frame pivotable about a swing axis extending in a transverse direction relative to the vehicle frame.

BACKGROUND INFORMATION

In technical systems, for example, in production plants, mobile transport systems, e.g., autonomously driving mobile transport systems, are used for transporting objects such as small parts or crates. The mobile transport systems bring components, for example, from logistics areas, such as a material warehouse, to workstations where the components are processed. Generic mobile transport systems are able to overcome slight rises or drops and small ground sills or similar obstacles.

A mobile transport system is described in German Patent Document No. 10 2017 201 108 and is implemented as an industrial truck, including a first support wheel at a front end, a second support wheel at a rear end, and a drive wheel disposed between the support wheels. The first support wheel is disposed on a driving frame, while the second support wheel and the drive wheel are disposed on a swing frame. The swing frame is hinged on the driving frame by a horizontal swing axis.

European Patent Document No. 2 826 693 describes a transport cart for transporting objects. The transport cart includes a front chassis part for mounting two front wheels of a front wheel pair, each rotatable about the vertical axis thereof. The front chassis part is connected to a rear chassis part implemented as a rocker for mounting two rear wheels of a rear wheel pair, each rotatable about the vertical axis thereof, and for mounting a middle wheel pair, each rotationally fixed about the vertical axis thereof between the front wheel and the rear wheels.

SUMMARY

Example embodiments of the present invention provide a mobile transport system for transporting objects. The mobile transport system is, for example, capable of compensating for uneven ground areas transverse to a direction of travel.

A mobile transport system for transporting objects in a technical system includes a vehicle frame, a first wheel pair, a second wheel pair, and a third wheel pair, each having two wheels. The wheels are rotatable relative to the vehicle frame. By rotating the wheels making contact with a ground, the transport system is displaceable relative to the ground. The mobile transport system further includes a swing frame pivotable about a swing axis extending in a transverse direction relative to the vehicle frame. The first wheels of the first wheel pair are attached to the vehicle frame, and the second wheels of the second wheel pair are attached to the swing frame.

The third wheels of the third wheel pair are attached to a tilt frame pivotable relative to the swing frame about a tilt axis extending approximately in the longitudinal direction.

The tilt axis, for example, extends precisely in the longitudinal direction.

The longitudinal direction corresponds at least approximately to the usual travel direction of the mobile transport system. The longitudinal direction extends perpendicular to the transverse direction. The longitudinal direction and the transverse direction are horizontal directions and extend parallel to the ground on which the mobile transport system is present. A vertical direction is perpendicular to the ground and extends perpendicular to the longitudinal direction and perpendicular to the transverse direction.

The configuration of the mobile transport system provides that the second wheels of the second wheel pair, the third wheels of the third wheel of the third wheel pair, and at least one wheel of the first wheel pair are continuously contacting the ground. Even when overcoming rises at the same time as uneven ground areas transverse to a direction of travel, at least five wheels of the mobile transport system are continuously contacting the ground. The second wheels of the second wheel pair further always have the same contact pressure on the ground. The third wheels of the third wheel pair also always have the same contact pressure on the ground. The use of springs is not necessary in order to achieve contact pressure of the wheels on the ground. Depending on the condition of the ground, no more than one of the first wheels of the first wheel pair loses contact with the ground. The mobile transport system is thus capable of compensating for uneven ground areas transverse to the direction of travel.

The first wheels of the first wheel pair are, for example, each implemented as support wheels and supported pivotably relative to the vehicle frame about a pivot axis extending in a vertical direction and rotatably relative to the vehicle frame about an axis of rotation extending in a horizontal direction. The third wheels of the third wheel pair are also, for example, each implemented as support wheels and supported pivotably relative to the vehicle frame about a pivot axis extending in a vertical direction and rotatably relative to the vehicle frame about an axis of rotation extending in a horizontal direction. Support wheels implemented in such a manner are relatively inexpensive and also facilitate the mobile transport system traveling around curves.

According to example embodiments, the second wheels of the second wheel pair are implemented as drive wheels and are rotatably supported relative to the swing frame about a drive axis extending in the transverse direction and can be driven by a drive unit. The drive unit includes, for example, an electric motor, a differential gearbox, and an electrical energy store. The drive wheels are thus continuously contacting the ground. Displacing the mobile transport system is thus possible at all times, approximately independently of the condition of the ground.

According to example embodiments, one braking device is disposed on each of the third wheels of the third wheel pair, by which a rotation of the corresponding third wheel about an axis of rotation extending in the horizontal direction can be braked. The braking devices can be electromagnetically actuated, for example. The third wheels having the braking devices thus continuously make contact with the ground. Braking of the mobile transport system is thus possible at all times, approximately independently of the condition of the ground. Additional braking devices at the first wheels and/or at the second wheels are not necessary.

The wheels of a wheel pair are, for example, each disposed offset to each other in the transverse direction.

According to example embodiments, a distance between the second wheels of the second wheel pair from each other in the transverse direction is greater than a distance of the first wheels of the first wheel pair from each other in the transverse direction. According to example embodiments, a distance between the second wheels of the second wheel pair from each other in the transverse direction is also greater than a distance of the third wheels of the third wheel pair from each other in the transverse direction. The six wheels of the three wheel pairs are disposed in the shape of a hexagon, for example, arranged symmetrically about a longitudinal axis. The four wheels of the first wheel pair and the second wheel pair form the corners of a rectangle. The second wheels of the second wheel pair are outside of the rectangle in the transverse direction.

The second wheels of the second wheel pair are, for example. disposed between the first wheels of the first wheel pair and the third wheels of the third wheel pair in the longitudinal direction.

According to example embodiments, a distance from the second wheels of the second wheel pair to the swing axis in the longitudinal direction is at least approximately equal to a distance from the third wheels of the third wheel pair to the swing axis in the longitudinal direction. The swing axis is thus disposed at least approximately centered in the longitudinal direction between the second wheels of the second wheel pair and the third wheels of the third wheel pair. The second wheels of the second wheel pair have approximately the same contact pressure on the ground as the third wheels of the third wheel pair. For example, the second wheels of the second wheel pair are implemented as drive wheels and a braking device is disposed at each of the third wheels of the third wheel pair.

According to example embodiments, a receiving unit is disposed on the swing frame, e.g., between the second wheels of the second wheel pair, to which energy can be transferred inductively from a charging unit. The charging unit is implemented as a linear conductor or as a coil, for example, and is stationary and present in the ground. The energy inductively transmitted from the charging unit to the receiving unit serves, for example, for charging an electrical energy store of the mobile transport system.

According to example embodiments, at least one inductive sensor for detecting a magnetic field is disposed on the swing frame. When the magnetic field is generated by a linear conductor laid down in the ground, for example, then the inductive sensor provides for following the linear conductor in order to reach a particular destination.

According to example embodiments, the mobile transport system includes a first angle meter for capturing a pivot angle of the swing frame relative to the vehicle frame about the swing axis. By capturing the pivot angle of the swing frame relative to the vehicle frame about the swing axis, it can be determined how great an impending rise in the travel direction is. When a permissible pivot angle is exceeded, it can be assumed that an impermissibly great rise is present, and a warning message is output or the mobile transport system is stopped.

According to example embodiments, the mobile transport system includes a second angle meter for capturing a pivot angle of the tilt frame relative to the swing frame about the tilt axis. By capturing the pivot angle of the tilt frame relative to the swing frame about the tilt axis, it can be determined how great an imminent uneven ground area transverse to the travel direction is. When a permissible pivot angle is exceeded, it can be assumed that an impermissibly large uneven ground area is present and a warning message is output or the mobile transport system is stopped.

Further features and aspects of example embodiments of the present invention are explained in greater detail below with reference to the appended schematic Figures.

DETAILED DESCRIPTION

Figure 1:
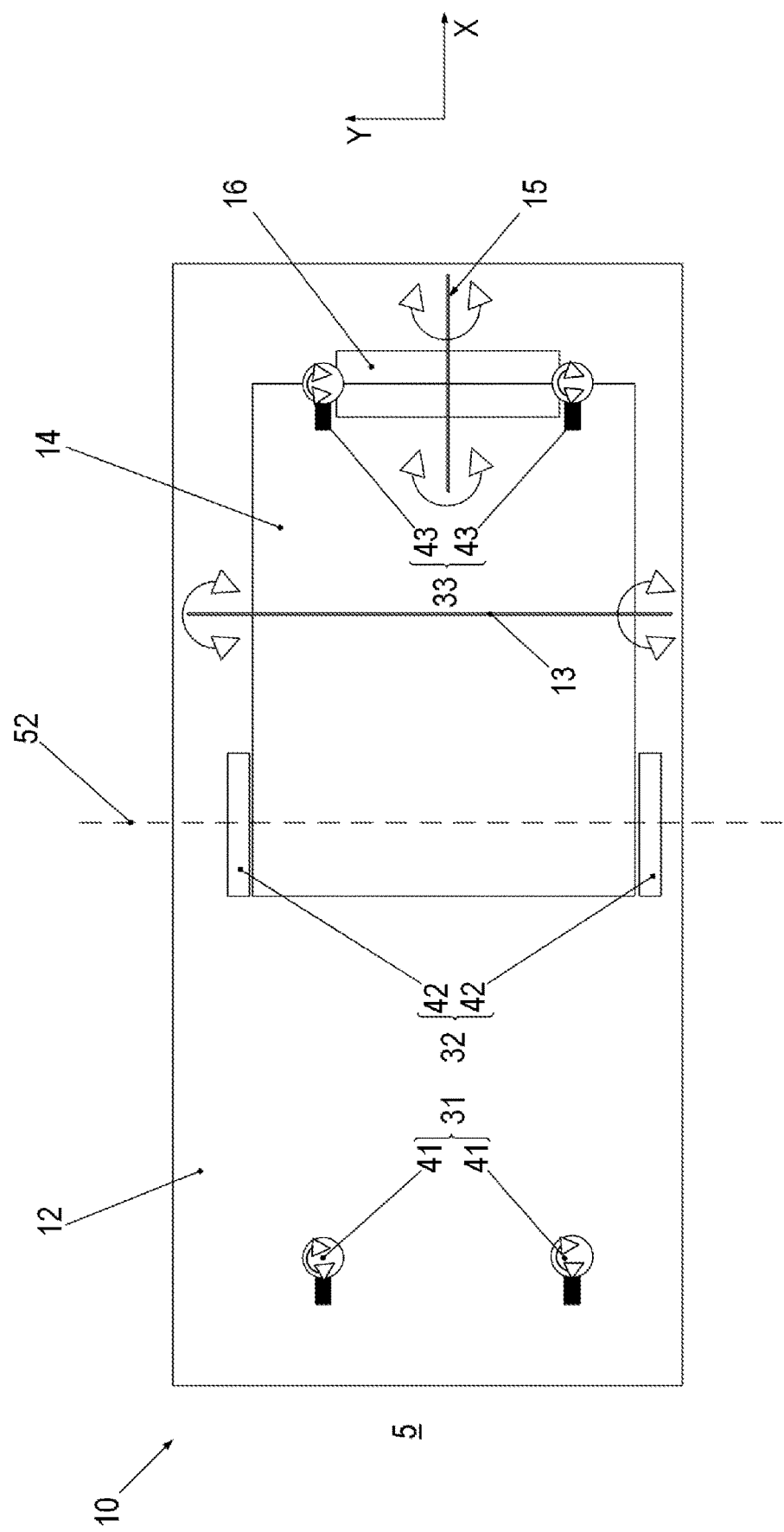
FIG. 1 is a schematic plan view of a mobile transport system.

FIG. 1 is a schematic plan view of a mobile transport system 10. The mobile transport system 10 is, for example, adapted for transporting objects in a technical system. The technical plant is an industrial application, such as a production plant. For example, the mobile transport system 10 is an automated guided vehicle. As illustrated, the mobile transport system 10 is present on a flat ground 5 within the technical plant.

The mobile transport system 10 includes a vehicle frame 12, a swing frame 14, and a tilt frame 16. The vehicle frame 12 has an approximately rectangular cross section and extends predominantly in a longitudinal direction X and in a transverse direction Y.

The longitudinal direction X corresponds at least approximately to the usual travel direction of the mobile transport system 10. The transverse direction Y extends perpendicular to the longitudinal direction X. The longitudinal direction X and the transverse direction Y are horizontal directions and extend parallel to the flat ground 5. A vertical direction Z is perpendicular to the flat ground 5 and thus extends perpendicular to the longitudinal direction X and perpendicular to the transverse direction Y. Each direction perpendicular to the vertical direction Z is a horizontal direction.

The swing frame 14 is pivotable about a swing axis 13 relative to the vehicle frame 12. The swing axis 13 extends in the transverse direction Y. The tilt frame 16 is pivotable relative to the swing frame 14 about a tilt axis 15. The tilt axis 15 extends in the longitudinal direction X, for example.

Two first support wheels 41 of a first wheel pair 31 are disposed on the vehicle frame 12 and are rotatable relative to the vehicle frame 12. The first wheels 41 are disposed offset to each other in the transverse direction Y. Two second wheels 42 of a second wheel pair 32 are disposed on the swing frame 14 and rotatable relative to the vehicle frame 12. The second wheels 42 are disposed offset to each other in the transverse direction Y. Two third wheels 43 of a third wheel pair 33 are disposed on the swing frame 16 and rotatable relative to the vehicle frame 12. The third wheels 43 are disposed offset to each other in the transverse direction Y.

A distance between the second wheels 42 of the second wheel pair 32 from each other in the transverse direction Y is greater than a distance of the first wheels 41 of the first wheel pair 31 from each other in the transverse direction Y. A distance between the second wheels 42 of the second wheel pair 32 from each other in the transverse direction Y is also greater than a distance of the third wheels 43 of the third wheel pair 33 from each other in the transverse direction Y. The six wheels 41, 42, 43 are disposed in the shape of a hexagon implemented symmetrically to a longitudinal axis extending in the longitudinal direction X.

The second wheels 42 of the second wheel pair 32 are implemented as drive wheels and are rotatably supported relative to the swing frame 14 about a drive axis 52 extending in the transverse direction Y. The mobile transport system 10 includes a drive unit, by which the second wheels 42 can be driven. The drive unit includes, for example, an electric motor, a differential gearbox, and an electrical energy store.

Figure 2:
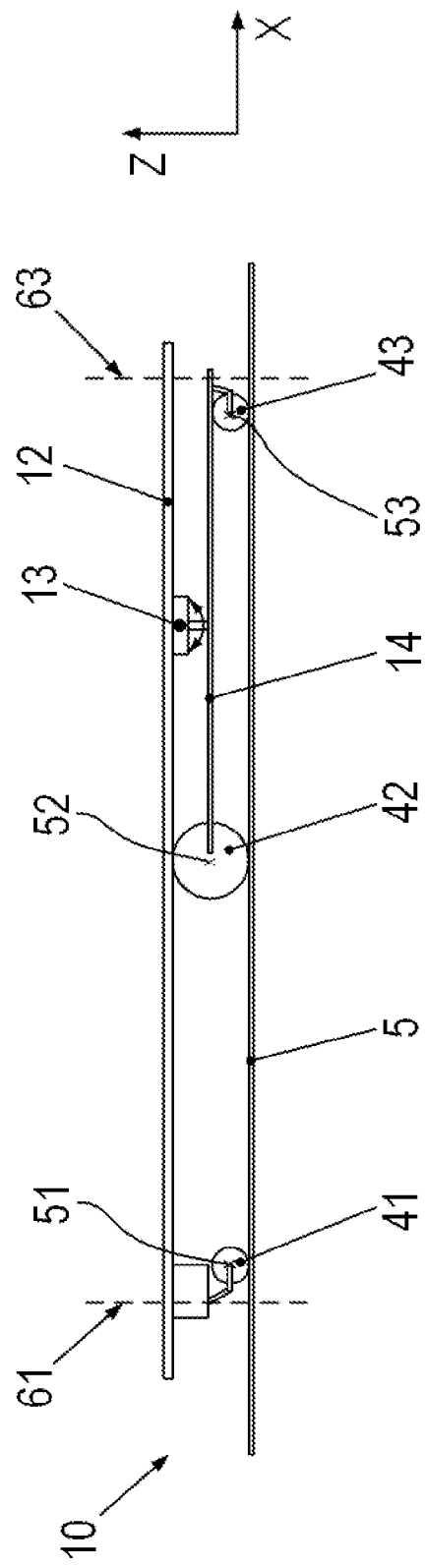
FIG. 2 is a schematic side view of the mobile transport system.

FIG. 2 is a schematic side view of the mobile transport system 10. The second wheels 42 of the second wheel pair 32 are disposed between the first wheels 41 of the first wheel pair 31 and the third wheels 43 of the third wheel pair 33 in the longitudinal direction X.

The first wheels 41 of the first wheel pair 31 are implemented as support wheels and are each pivotable relative to the vehicle frame 12 about a first pivot axis 61 extending in the vertical direction Z. The first wheels 41 are each further supported rotatably relative to the vehicle frame 12 about a first axis of rotation 51 extending in a horizontal direction. As illustrated, the first axes of rotation 51 extend in the transverse direction Y. Depending on a pivoting of the first support wheels 41 about the first pivot axis 61, the first axes of rotation 51 extend in the longitudinal direction X, for example, or in a different horizontal direction. The first pivot axis 61 and the first axis of rotation 51 of a first wheel 41 do not intersect.

The third wheels 43 of the third wheel pair 33 are implemented as support wheels and are each pivotable relative to the vehicle frame 12 about a third pivot axis 63 extending in the vertical direction Z. The third wheels 41 are each further supported rotatably relative to the vehicle frame 12 about a third axis of rotation 53 extending in a horizontal direction. As illustrated, the third axes of rotation 53 extend in the transverse direction Y. Depending on a pivoting of the third wheels 43 about the third pivot axis 63, the third axes of rotation 53 extend in the longitudinal direction X, for example, or in a different horizontal direction. The third pivot axis 63 and the third axis of rotation 53 of a third wheel 43 do not intersect.

A distance from the second wheels 42 of the second wheel pair 32 to the swing axis 13 in the longitudinal direction X is at least approximately equal to a distance from the third wheels 43 of the third wheel pair 33 to the swing axis 13 in the longitudinal direction X. The distance from the second wheels 42 to the swing axis 13 in the longitudinal direction X corresponds to the distance from the drive axis 52 to the swing axis 13 in the longitudinal direction X. The distance from the third wheels 43 to the swing axis 13 in the longitudinal direction X corresponds to the distance from the third pivot axis 63 to the swing axis 13 in the longitudinal direction X.

Figure 3:
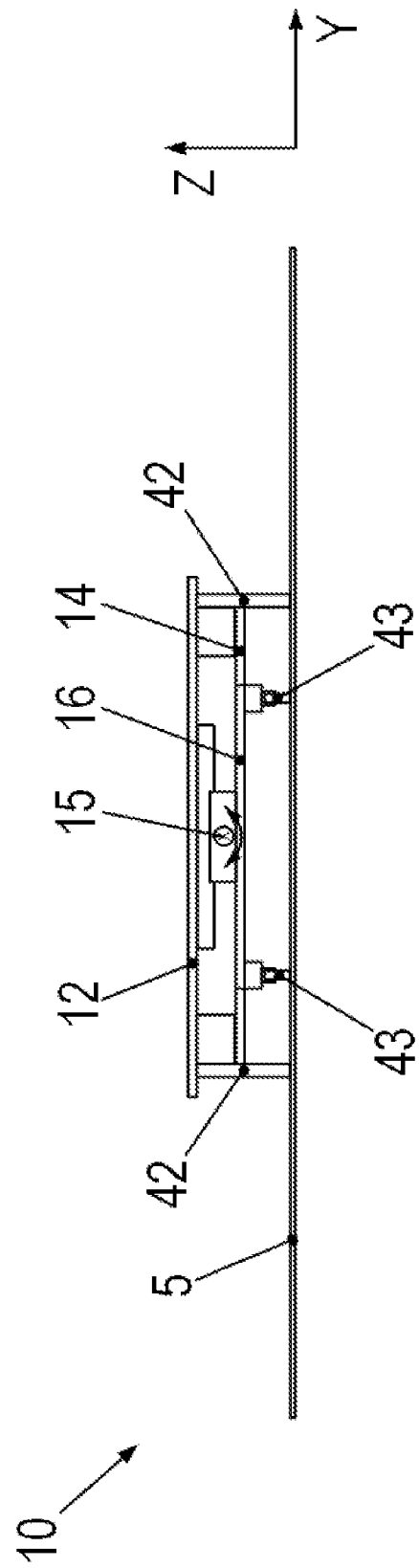
FIG. 3 is a schematic front view of the mobile transport system.

FIG. 3 is a schematic front view of the mobile transport system 10. The first wheels 41 of the first wheel pair 31 are covered by the third wheels 43 of the third wheel pair 33 and therefore are not visible.

Figure 4:
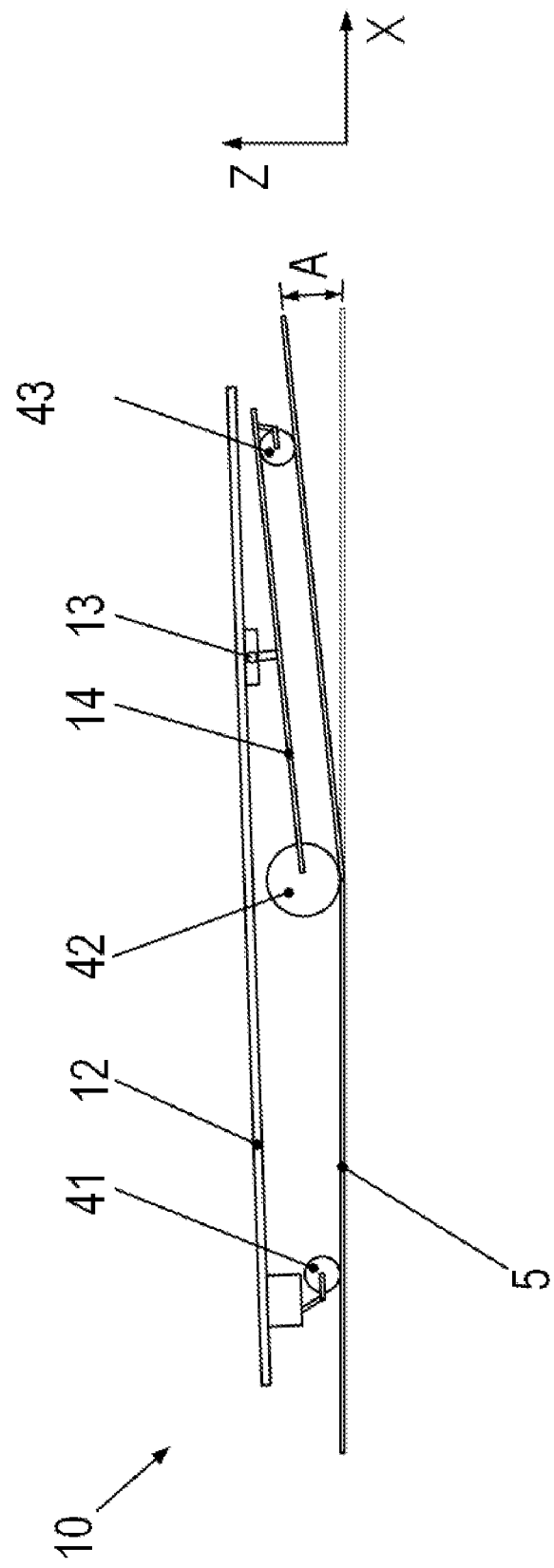
FIG. 4 is a schematic side view of the mobile transport system when traveling on a rise.

FIG. 4 is a schematic side view of the mobile transport system 10 when traveling on a rise inclined by an angle A with respect to the flat ground 5. As illustrated, the first wheels 41 are present on the flat ground 5, the third wheels 43 are present on the rise, and the second wheels 42 are present at the transition from the flat ground 5 to the rise. The swing frame 14 is pivoted about a swing axis 13 relative to the vehicle frame 12. The first wheels 41, the second wheels 42, and the third wheels 43 make contact with the ground.

Figure 5:
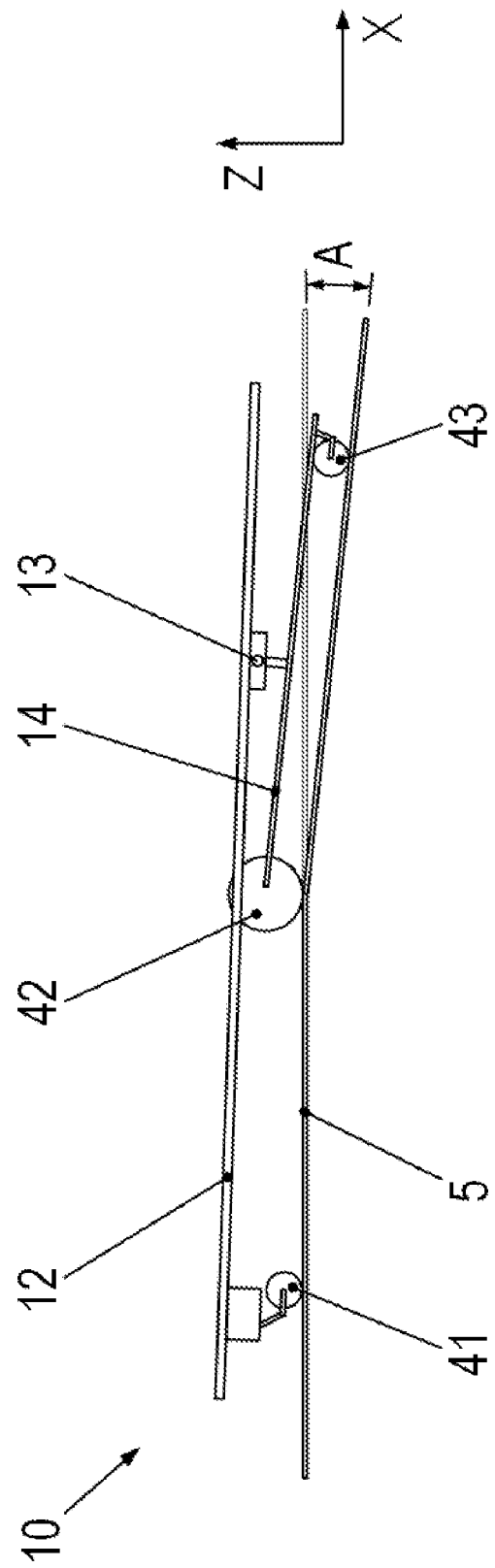
FIG. 5 is a schematic side view of the mobile transport system when traveling on a drop.

FIG. 5 is a schematic side view of the mobile transport system 10 when traveling on a drop inclined by an angle A with respect to the flat ground 5. As illustrated, the first wheels 41 are present on the flat ground 5, the third wheels 43 are present on the drop, and the second wheels 42 are present at the transition from the flat ground 5 to the drop. The swing frame 14 is pivoted about a swing axis 13 relative to the vehicle frame 12. The first wheels 41, the second wheels 42, and the third wheels 43 make contact with the ground.

When the swing frame 14 is pivoted about the swing axis 13 relative to the vehicle frame 12, as illustrated in FIG. 4 and FIG. 5, the tilt axis 15 extends slightly inclined to the longitudinal direction X. The inclination of the tilt axis 15 is, however, relatively slight. The tilt axis 15 thus extends approximately in the longitudinal direction X. The third pivot axes 63 also extend slightly inclined to the vertical direction Z. The inclination of the third swing axes 63 is also relatively slight.

Figure 6:
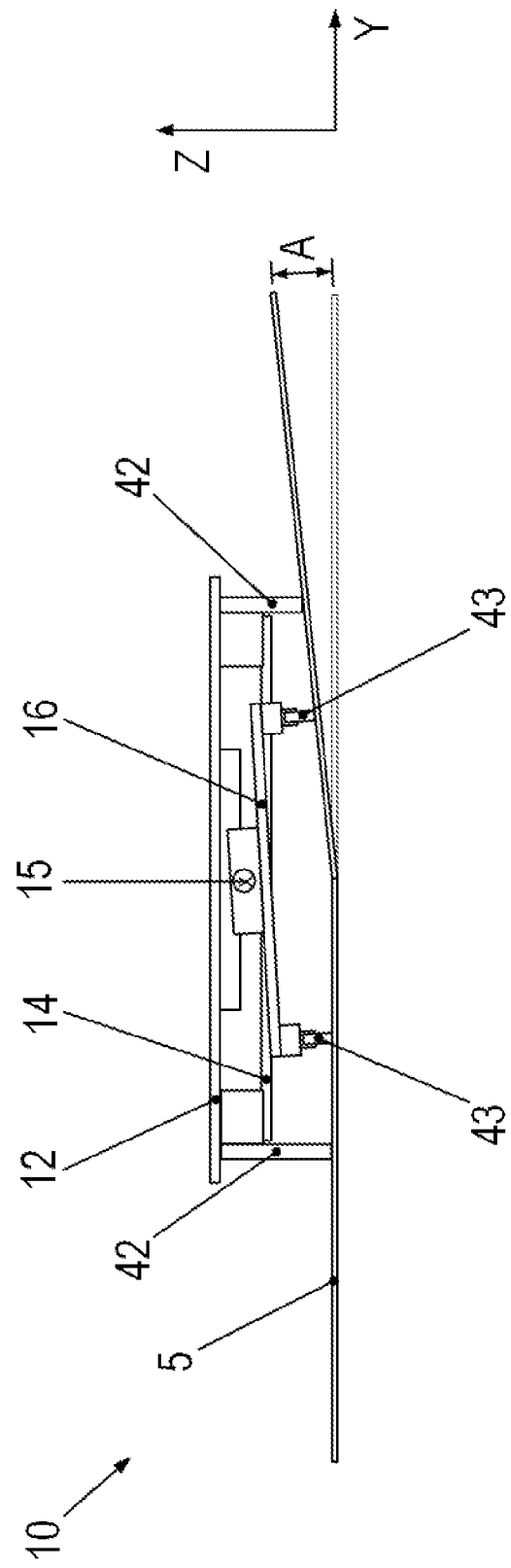
FIG. 6 is a schematic side view of the mobile transport system when traveling on a laterally rising ramp.

FIG. 6 is a schematic side view of the mobile transport system 10 when traveling on a laterally rising ramp, inclined by an angle A with respect to the flat ground 5. As illustrated, the first wheels 41 are present on the flat ground 5. The second wheels 42 are also present on the flat ground 5. One of the third wheels 43 is also present on the flat ground 5, and the other of the third wheels 43 is present on the laterally rising ramp. The tilt frame 16 is pivoted relative to the swing frame 14 about a tilt axis 15. The first wheels 41, the second wheels 42, and the third wheels 43 make contact with the ground.

Figure 7:
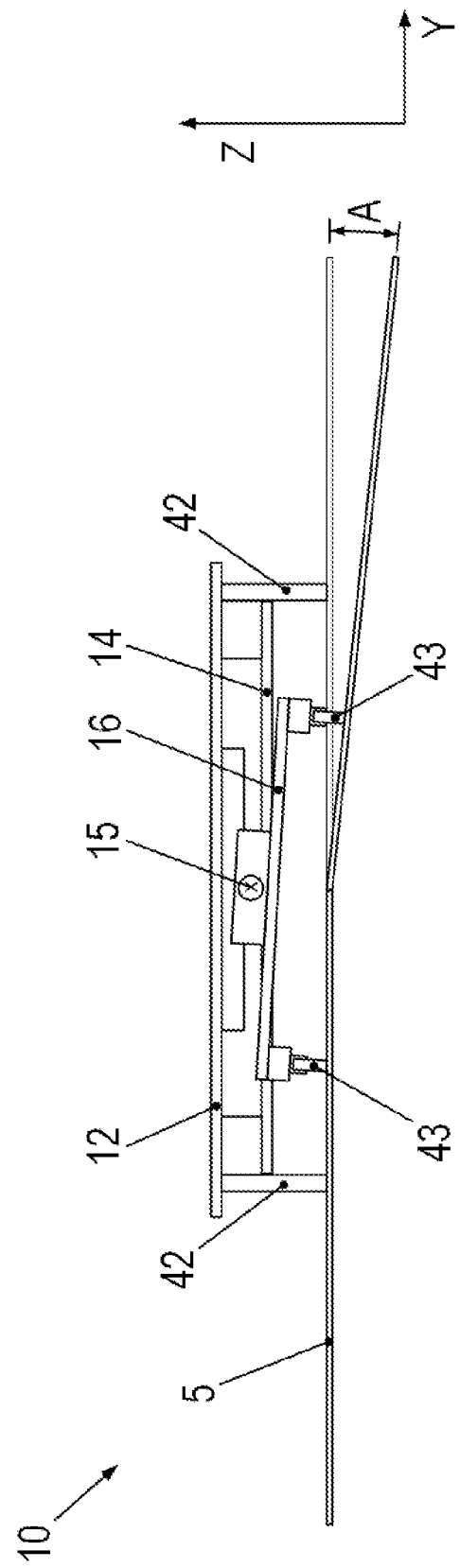
FIG. 7 is a schematic side view of the mobile transport system when traveling on a laterally dropping ramp.

FIG. 7 is a schematic side view of the mobile transport system 10 when traveling on a laterally dropping ramp, inclined by an angle A with respect to the flat ground 5. As illustrated, the first wheels 41 are present on the flat ground 5. The second wheels 42 are also present on the flat ground 5. One of the third wheels 43 is also present on the flat ground 5, and the other of the third wheels 43 is present on the laterally dropping ramp. The tilt frame 16 is pivoted relative to the swing frame 14 about a tilt axis 15. The first wheels 41, the second wheels 42, and the third wheels 43 make contact with the ground.

When the tilt frame 16, as illustrated in FIG. 6 and FIG. 7, is pivoted relative to the swing frame 14 about the tilt axis 15, the third pivot axes 63 extends slightly inclined to the vertical direction Z. The inclination of the third swing axes 63 is, however, relatively slight. The third axes of rotation 53 also extend slightly inclined to a horizontal direction. The inclination of the third axes of rotation 53 is also relatively slight.

Figure 8:
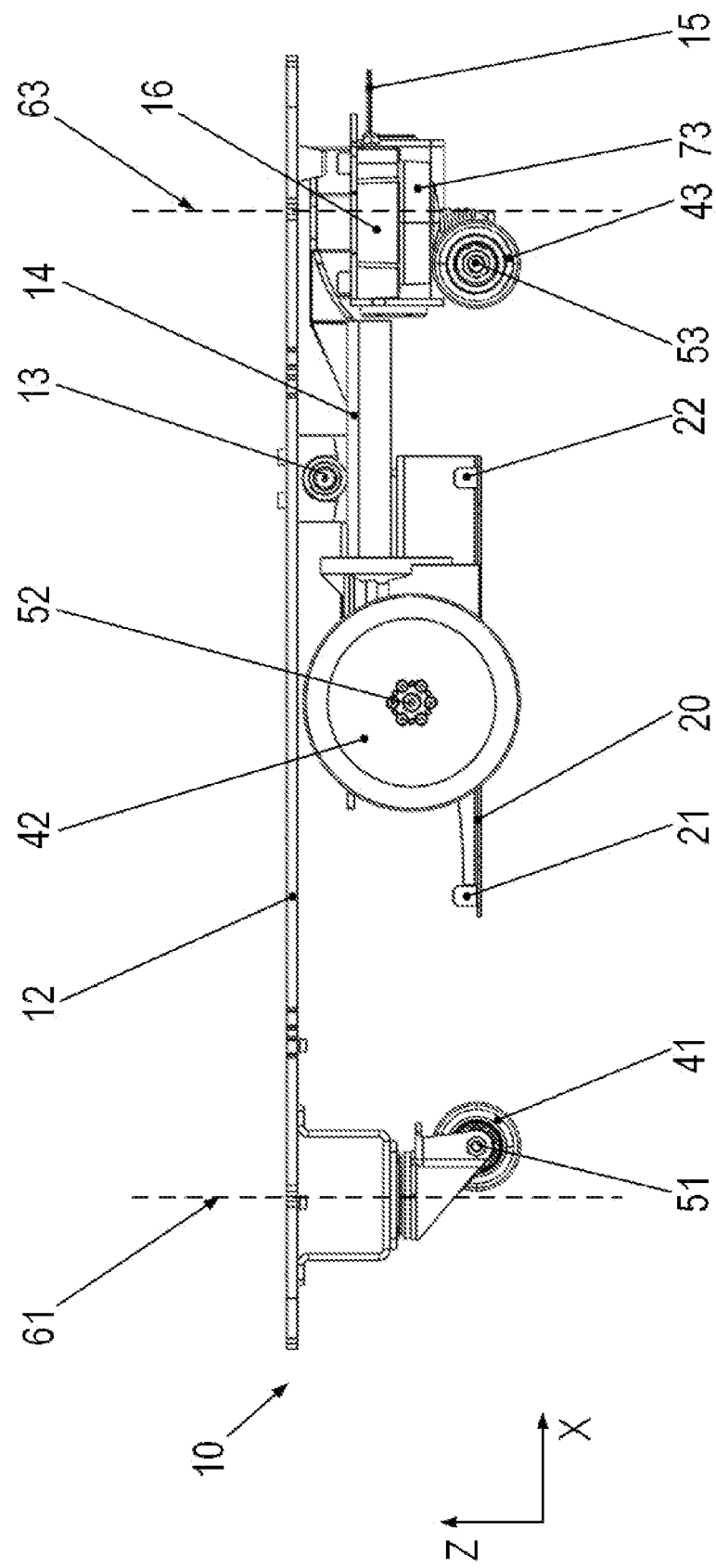
FIG. 8 is a detailed side view of the mobile transport system.

FIG. 8 is a detailed side view of the mobile transport system 10. The depiction corresponds to the depiction in FIG. 2, in which, however, additional details of the mobile transport system 10 are illustrated.

The mobile transport system 10 includes a receiving unit 20 disposed on the swing frame 14 and to which energy can be transmitted inductively from a charging unit. The charging unit is implemented as a linear conductor or as a coil, for example. The energy inductively transmitted from the charging unit to the receiving unit 20 serves, for example, for charging an electrical energy store of the mobile transport system 10. The receiving unit 20 is thus present between the second wheels 42.

The mobile transport system 10 further includes a first inductive sensor 21 and a second inductive sensor 22 disposed on the swing frame 14. The inductive sensors 21, 22 serve for detecting a magnetic field. When the magnetic field is generated by a linear conductor arranged in the ground, for example, the inductive sensors 21, 22 provide for following the linear conductor in order to reach a particular destination. The inductive sensors 21, 22 are disposed offset to each other in the longitudinal direction X. The first inductive sensor 21 is present between the drive axis 52 and the first pivot axis 61 in the longitudinal direction X. The second inductive sensor 22 is present between the drive axis 52 and the third pivot axis 63 in the longitudinal direction X. The inductive sensors 21, 22 are present approximately centered between the two wheels 42 in the transverse direction Y.

The mobile transport system 10 also includes two braking devices 73, and one braking device 73 is disposed at each of the third wheels 43. The rotation of each third wheel 43 about the third axis of rotation 53 extending the horizontal direction can be braked by the braking device 73. The braking devices 73 are electromagnetically actuatable.

LIST OF REFERENCE CHARACTERS

5 Flat ground
10 Mobile transport system
12 Vehicle frame
13 Swing axis
14 Swing frame
15 Tilt axis
16 Tilt frame
20 Receiving unit
21 First inductive sensor
22 Second inductive sensor
31 First wheel pair
32 Second wheel pair
33 Third wheel pair
41 First wheel
42 Second wheel
43 Third wheel
51 First axis of rotation
52 Drive axis
53 Third axis of rotation
61 First pivot axis
63 Third pivot axis
73 Braking device
A Angle
X Longitudinal direction
Y Transverse direction
Z Vertical direction

The invention claimed is:

1. A mobile transport system for transporting objects in a technical system, comprising:
a vehicle frame;
a swing frame pivotable about a swing axis extending in a transverse direction relative to the vehicle frame;
a tilt frame pivotable relative to the swing frame about a tilt axis extending approximately in a longitudinal direction;
a first wheel pair including two first wheels rotatable relative to the vehicle frame and attached to the vehicle frame;
a second wheel pair including two second wheels rotatable relative to the vehicle frame and attached to the swing frame; and
a third wheel pair including two third wheels rotatable relative to the frame and attached to the tilt frame;
wherein a braking device is arranged on each of the third wheels and is adapted to brake a rotation of the third wheel about an axis of rotation extending in a horizontal direction.

2. The mobile transport system according to claim 1, wherein the first wheels and/or the third wheels are arranged as support wheels, are pivotable relative to the vehicle frame about a pivot axis extending a vertical direction, and are supported rotatably relative to the vehicle frame about an axis of rotation extending in a horizontal direction.

3. The mobile transport system according to claim 1, wherein the first wheels are arranged as support wheels, are pivotable relative to the vehicle frame about a pivot axis extending a vertical direction, and are supported rotatably relative to the vehicle frame about an axis of rotation extending in a horizontal direction.

4. The mobile transport system according to claim 1, wherein the third wheels are arranged as support wheels, are pivotable relative to the vehicle frame about a pivot axis extending a vertical direction, and are supported rotatably relative to the vehicle frame about an axis of rotation extending in a horizontal direction.

5. The mobile transport system according to claim 1, wherein the first wheels and the third wheels are arranged as support wheels, are pivotable relative to the vehicle frame about a pivot axis extending a vertical direction, and are supported rotatably relative to the vehicle frame about an axis of rotation extending in a horizontal direction.

6. The mobile transport system according to claim 1, wherein the second wheels are arranged as drive wheels, are rotatably supported relative to the swing frame about a drive axis extending in the transverse direction, and are adapted to be driven by a drive unit.

7. The mobile transport system according to claim 1, wherein the first wheels, the second wheels, and/or the third wheels are arranged offset to each other in the transverse direction.

8. The mobile transport system according to claim 1, wherein the first wheels are arranged offset to each other in the transverse direction, the second wheels are arranged offset to each other in the transverse direction, and/or the third wheels are arranged offset to each other in the transverse direction.

9. The mobile transport system according to claim 1, wherein a distance between the second wheels from each other in the transverse direction is greater than a distance of the first wheels from each other in the transverse direction, and/or a distance of the second wheels from each other in the transverse direction is greater than a distance of the third wheels from each other in the transverse direction.

10. The mobile transport system according to claim 1, wherein a distance between the second wheels from each other in the transverse direction is greater than a distance of the first wheels from each other in the transverse direction.

11. The mobile transport system according to claim 1, wherein a distance of the second wheels from each other in the transverse direction is greater than a distance of the third wheels from each other in the transverse direction.

12. The mobile transport system according to claim 1, wherein a distance between the second wheels from each other in the transverse direction is greater than a distance of the first wheels from each other in the transverse direction, and a distance of the second wheels from each other in the transverse direction is greater than a distance of the third wheels from each other in the transverse direction.

13. The mobile transport system according to claim 1, the second wheels are arranged between the first wheels and the third wheels in the longitudinal direction.

14. The mobile transport system according to claim 1, wherein a distance from the second wheels to the swing axis in the longitudinal direction is at least approximately equal to a distance from the third wheels to the swing axis in the longitudinal direction.

15. The mobile transport system according to claim 1, wherein a distance from the second wheels to the swing axis in the longitudinal direction is equal to a distance from the third wheels to the swing axis in the longitudinal direction.

16. The mobile transport system according to claim 1, further comprising a receiving unit arranged on the swing frame and adapted to receive energy transferred inductively from a charging unit.

17. The mobile transport system according to claim 1, further comprising at least one inductive sensor arranged on the swing frame and adapted to detect a magnetic field.

18. The mobile transport system according to claim 1, further comprising an angle sensor adapted to detect a pivot angle of the swing frame relative to the vehicle frame about the swing axis.

19. The mobile transport system according to claim 1, further comprising an angle sensor adapted to detect a pivot angle of the tilt frame relative to the swing frame about the tilt axis.

20. The mobile transport system according to claim 1, further comprising a first angle sensor adapted to detect a pivot angle of the swing frame relative to the vehicle frame about the swing axis and a second angle sensor adapted to detect a pivot angle of the tilt frame relative to the swing frame about the tilt axis.

21. A mobile transport system for transporting objects in a technical system, comprising:

a vehicle frame;

a swing frame pivotable about a swing axis extending in a transverse direction relative to the vehicle frame;

a tilt frame pivotable relative to the swing frame about a tilt axis extending in a longitudinal direction;

a first wheel pair including two first wheels rotatable relative to the vehicle frame and attached to the vehicle frame;

a second wheel pair including two second wheels rotatable relative to the vehicle frame and attached to the swing frame; and a third wheel pair including two third wheels rotatable relative to the frame and attached to the tilt frame;

wherein a braking device is arranged on each of the third wheels and is adapted to brake a rotation of the third wheel about an axis of rotation extending in a horizontal direction.

* * * * *